(12) United States Patent
Matsui et al.

(10) Patent No.: US 11,145,943 B2
(45) Date of Patent: Oct. 12, 2021

(54) BATTERY PACK AND SECONDARY BATTERY FOR THE SAME

(71) Applicant: SANYO Electric Co., Ltd., Daito (JP)

(72) Inventors: Yu Matsui, Hyogo (JP); Takashi Hosokawa, Hyogo (JP); Kyohei Kobayashi, Hyogo (JP); Naotake Yoshida, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 331 days.

(21) Appl. No.: 16/267,764

(22) Filed: Feb. 5, 2019

(65) Prior Publication Data

US 2019/0305287 A1 Oct. 3, 2019

(30) Foreign Application Priority Data

Mar. 29, 2018 (JP) .............................. JP2018-066017

(51) Int. Cl.
*H01M 2/34* (2006.01)
*H01M 2/12* (2006.01)
*H01M 2/20* (2006.01)
*H01M 50/578* (2021.01)
*H01M 50/317* (2021.01)
*H01M 50/502* (2021.01)

(52) U.S. Cl.
CPC ....... *H01M 50/578* (2021.01); *H01M 50/317* (2021.01); *H01M 50/502* (2021.01); *H01M 2220/20* (2013.01)

(58) Field of Classification Search
CPC ............. H01M 50/578; H01M 50/502; H01M 50/503; H01M 50/505; H01M 50/507
See application file for complete search history.

(56) References Cited

U.S. PATENT DOCUMENTS

2006/0267545 A1* 11/2006 Lee ..................... H01M 50/209
320/106
2010/0167116 A1 7/2010 Okada
(Continued)

FOREIGN PATENT DOCUMENTS

JP 2010-157451 A 7/2010
JP 4815016 B2 11/2011
(Continued)

*Primary Examiner* — Christopher P Domone
(74) *Attorney, Agent, or Firm* — Westerman, Hattori, Daniels & Adrian, LLP (57) ABSTRACT

A battery pack includes a battery unit including rectangular secondary batteries, each including a sealing plate and positive and negative electrode terminals attached to the sealing plate; a bus bar that connects the rectangular secondary batteries together in parallel; an insulating plate disposed between the sealing plates of the rectangular secondary batteries and the bus bar; and a short-circuit breaking portion that interrupts an electric conduction path between the rectangular secondary batteries connected in parallel by allowing each sealing plate to bulge outward in response to an internal pressure rise of the battery to push up the insulating plate and the bus bar. A portion of each sealing plate that bulges most protrudes outward by greater than or equal to 1.5 mm from an outer peripheral edge of the sealing plate when a pressure in the corresponding rectangular secondary battery reaches the operating pressure of a gas release valve.

6 Claims, 8 Drawing Sheets

(56) References Cited

U.S. PATENT DOCUMENTS

| | | | |
|---|---|---|---|
| 2011/0039147 A1* | 2/2011 | Cheon | H01M 50/572 |
| | | | 429/159 |
| 2011/0177365 A1 | 7/2011 | Yasui et al. | |
| 2013/0189552 A1 | 7/2013 | Okada | |
| 2013/0196185 A1 | 8/2013 | Yokoyama et al. | |
| 2014/0062418 A1* | 3/2014 | Lim | H01M 50/578 |
| | | | 320/137 |
| 2015/0207131 A1* | 7/2015 | Han | H01M 50/502 |
| | | | 429/61 |
| 2015/0303443 A1 | 10/2015 | Yokoyama et al. | |
| 2018/0076439 A1* | 3/2018 | Lee | H01M 50/572 |

FOREIGN PATENT DOCUMENTS

| | | |
|---|---|---|
| JP | 2013-157099 A | 8/2013 |
| JP | 2013-206734 A | 10/2013 |

\* cited by examiner

BATTERY PACK AND SECONDARY BATTERY FOR THE SAME

CROSS REFERENCE TO RELATED APPLICATIONS

The present invention application claims priority to Japanese Patent Application No. 2018-066017 filed in the Japan Patent Office on Mar. 29, 2018, the entire contents of which are incorporated herein by reference.

BACKGROUND OF THE INVENTION

Field of the Invention

The present disclosure relates to a battery pack and a secondary battery for the same.

Description of Related Art

A battery pack including multiple secondary batteries is known. This battery pack can increase an output current with parallel connection of adjacent secondary batteries, and can increase output power with serial connection of the parallel-connected secondary batteries. Such a battery pack is thus preferably employed for the purpose of use that requires large output power (such as for driving a vehicle).

When such a battery pack including high-performance secondary batteries, such as lithium ion secondary batteries, is internally short-circuited, an extremely high current may flow to cause the secondary batteries to overheat. Particularly, when an overheating secondary battery triggers overheating of a secondary battery adjacent to the secondary battery, the heat energy produced by the battery pack including multiple secondary batteries suddenly increases.

To enhance the reliability of secondary batteries, secondary batteries including a current interrupt device (hereinafter referred to as a "CID") has been developed (refer to Japanese Published Unexamined Patent Application No. 2010-157451 or Patent Document 1).

A CID is a device that is actuated by a pressure rise in a battery in response to the generation of gas resulting from an abnormal event such as a short-circuit or overheating of a secondary battery and decomposition of, for example, an electrolyte solution or a gas forming agent. The CID disconnects an electric conduction path between an electrode and an electrode terminal to interrupt a current.

BRIEF SUMMARY OF THE INVENTION

In a battery pack including adjacent secondary batteries connected in parallel, overheating of an internally short-circuited secondary battery (hereinafter appropriately referred to as a "trigger battery") may trigger overheating of a secondary battery connected in parallel with the trigger battery.

A mechanism of the above-described trigger of overheating is described as follows. When a trigger battery is internally short-circuited and the trigger battery overheats, gas is generated inside the trigger battery. The generation of gas raises the internal pressure of the battery to or over a predetermined value to actuate the CID. The trigger battery thus has an electric conduction path between an electrode and an electrode terminal interrupted. Regardless of the actuation of the CID and the interruption of the short-circuit current, the trigger battery keeps overheating and having a high temperature. Thus, an insulating member of a sealing plate of the trigger battery, which is supposed to electrically insulate a positive terminal and a negative terminal from each other, melts and no longer performs its insulating function. Thus, the positive terminal and the negative terminal are electrically connected to each other via the sealing plate formed from a metal plate. Specifically, the trigger battery serves as a low-resistance conductor. Consequently, a secondary battery adjacent to the trigger battery and connected in parallel is externally short-circuited via the positive terminal, the sealing plate, and the negative terminal of the trigger battery. The external short-circuit via the trigger battery thus allows a large current to flow to the adjacent secondary battery. Thus, the adjacent secondary battery is heated by the Joule's heat to trigger overheating.

An object of the present disclosure is to provide a battery pack that prevents a secondary battery that has been internally short-circuited and that has overheated from triggering overheating of a secondary battery adjacent to and connected in parallel with the overheating secondary battery, and to provide a secondary battery for the same.

A battery pack according to an aspect of the present disclosure includes a battery unit including a plurality of secondary batteries, each including a sealing plate and a positive electrode terminal attached to the sealing plate and a negative electrode terminal attached to the sealing plate; a bus bar that connects the secondary batteries together in parallel; an insulating plate disposed between the sealing plate of each secondary battery and the bus bar; and a short-circuit breaking portion that interrupts an electric conduction path between the secondary batteries connected in parallel by allowing each sealing plate to bulge outward in response to an internal pressure rise of the corresponding secondary battery to push up the insulating plate and push up the bus bar with the insulating plate interposed therebetween. Each sealing plate includes a gas release valve that opens when receiving a pressure of higher than or equal to a predetermined operating pressure. A portion of each sealing plate that bulges most protrudes outward by greater than or equal to 1.5 mm from an outer peripheral edge of the sealing plate when a pressure in the corresponding secondary battery reaches the operating pressure of the gas release valve.

A battery pack and a secondary battery for the same according to the present disclosure can prevent a secondary battery that has been internally short-circuited and that has overheated from triggering overheating of a secondary battery adjacent to and connected in parallel with the overheating secondary battery.

DETAILED DESCRIPTION OF THE INVENTION

Embodiments according to the present disclosure will now be described in detail with reference to the drawings. In the description, specific shapes, materials, numerical values, directions, and other features are given as mere examples for facilitating the understanding of the present disclosure, and may be appropriately changed in accordance with, for example, the purposes of use, objects, or specifications. It has been originally assumed that characteristic portions among multiple embodiments and modifications examples, if included in the following description, are appropriately combined.

Figure 1:
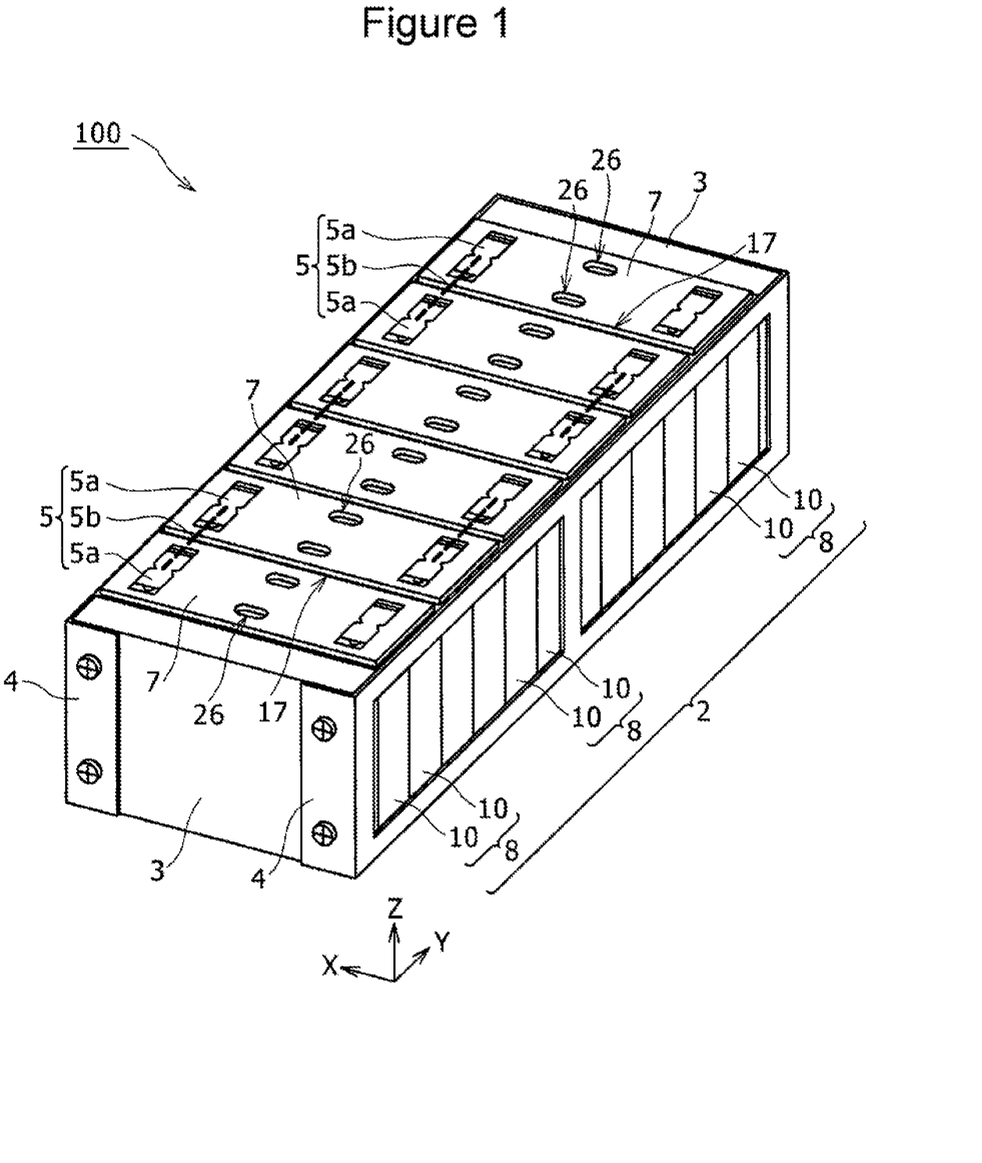
FIG. 1 is a perspective view of a battery pack according to an embodiment of the present disclosure.
Figure 2:
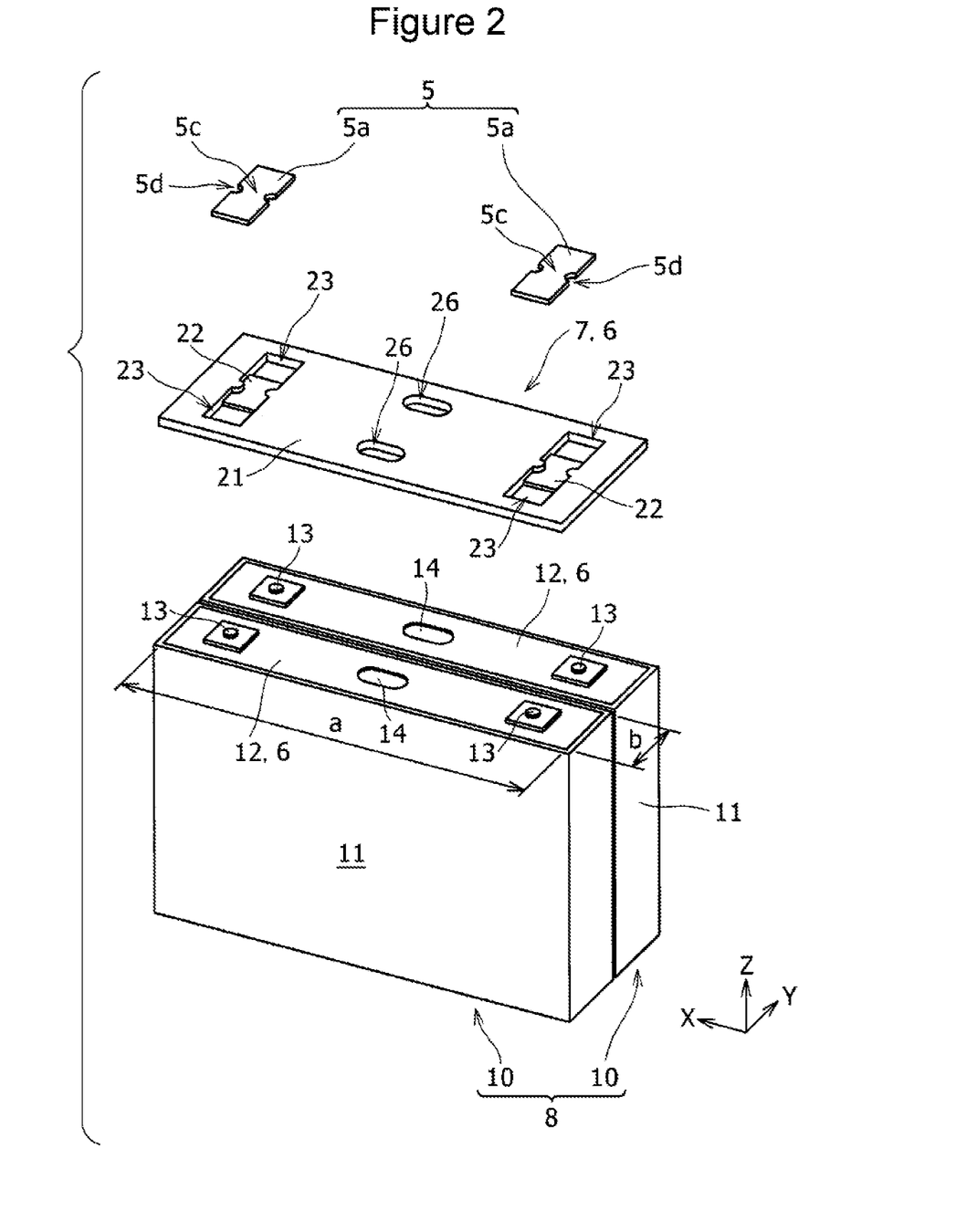
FIG. 2 is an exploded perspective view of a parallel-connected battery unit of the battery pack illustrated in FIG. 1.

FIG. 1 is a perspective view of a battery pack 100 according to an embodiment of the present disclosure. FIG. 2 is an exploded perspective view of a parallel-connected battery unit of the battery pack illustrated in FIG. 1. In FIG. 1 and FIG. 2, the width direction is denoted with arrow X, the thickness direction is denoted with arrow Y, and the height direction is denoted with arrow Z. These three directions are perpendicular to each other.

As illustrated in FIG. 1, the battery pack 100 includes a battery block 2, including a stack of multiple rectangular secondary batteries 10, and bus bars 5 connected to electrode terminals 13 of the rectangular secondary batteries 10 constituting the battery block 2 and connecting the rectangular secondary batteries 10 together in parallel and in series.

In the battery pack 100, the rectangular secondary batteries 10 are connected in parallel and in series. More specifically, the bus bars 5 include parallel-connection bus bars 5a, which connect the rectangular secondary batteries 10 in parallel, and serial-connection bus bars 5b, which connect the rectangular secondary batteries 10 in series. The battery pack 100 can increase the output current through parallel connection of the rectangular secondary batteries 10, and increase the output voltage through serial connection of the rectangular secondary batteries 10. Thus, the battery pack 100 includes the rectangular secondary batteries 10 connected in parallel and in series to produce an output current and output voltage optimum for its purpose of use.

The battery block 2 includes the multiple rectangular secondary batteries 10 stacked one on another with insulating separators (not illustrated) interposed therebetween. The battery block 2 includes a pair of end plates 3, disposed on both end surfaces of a stack of the multiple rectangular secondary batteries 10 in the stack direction, and binding bars 4, which couple the end plates 3 with each other, to fix the multiple rectangular secondary batteries 10 in a pressed state.

The battery pack 100 according to the present embodiment is an example where the multiple rectangular secondary batteries 10 are fixed in a pressed state. However, this is not the only possible example, and the battery pack may include rectangular secondary batteries and separators that are in contact with each other without being pressed against each other.

Preferably, the rectangular secondary batteries 10 are non-aqueous electrolyte secondary batteries such as lithium ion secondary batteries.

As illustrated in FIG. 2, the rectangular secondary batteries 10 each include a battery case 11 and a sealing plate 12. The battery case 11 is a housing having a flat rectangular parallelepiped profile, and has an upper end open in a rectangular shape when viewed in a plan. The battery case 11 can be formed by subjecting a metal plate to deep drawing. Preferably, the battery case 11 and the sealing plate 12 are formed from a metal, or specifically, aluminum or an aluminum alloy.

An outer peripheral edge of the sealing plate 12 is fixed to an opening edge of the battery case 11 by, for example, laser welding. The sealing plate 12 has a positive-terminal receiving hole and a negative-terminal receiving hole. The positive electrode terminal 13 is inserted into the positive-terminal receiving hole while being insulated from the sealing plate 12 with a resin-made insulating member. The negative electrode terminal 13 is inserted into the negative-terminal receiving hole while being insulated from the sealing plate 12 with a resin-made insulating member.

The sealing plate 12 is a flexible plate that deforms in response to an internal pressure rise due to an abnormal event such as an internal short-circuit of the rectangular secondary battery 10. The sealing plate 12 may be a flexible metal plate formed from, for example, aluminum (aluminum includes the meaning of an aluminum alloy, herein). The metal-made sealing plate 12 having its material and thickness adjusted can be made flexible to be deformable when the rectangular secondary battery 10 is internally short-circuited and has its internal pressure raised.

The sealing plate 12 includes a gas release valve 14. The gas release valve 14 is disposed between the positive electrode terminal 13 and the negative electrode terminal 13 in the longitudinal direction of the sealing plate 12. The gas release valve 14 opens in response to an internal pressure rise of the battery case 11, hermetically sealed with the sealing plate 12, to or over a predetermined value to release gas inside. The gas release valve 14 has an operating pressure at which it opens after the short-circuit current path of the parallel-connected batteries is interrupted by a short-circuit breaking portion 6, described below. In the description, each parallel-connected battery refers to a secondary battery connected in parallel with another secondary battery.

The battery case 11 houses an electrode and a non-aqueous electrolyte. The electrode may be, for example, a flat wound electrode formed by winding a belt-like positive electrode plate and a belt-like negative electrode plate with a belt-like separator interposed therebetween. Such a flat wound electrode has a positive-electrode-core exposed portion at one end portion in a winding axis direction, and a negative-electrode-core exposed portion at the other end in the winding axis direction. The electrode is housed in the battery case 11 while having its winding axis aligned with the width direction of the rectangular secondary batteries 10.

A positive electrode collector is connected to a positive-electrode-core exposed portion of the electrode by, for example, ultrasonic bonding. A negative electrode collector is connected to a negative-electrode-core exposed portion of the electrode by, for example, ultrasonic bonding. The positive electrode collector is electrically connected to a battery internal end portion of the positive electrode terminal 13 with a CID interposed therebetween in the battery case 11. The negative electrode collector is electrically connected to a battery internal end portion of the negative electrode terminal 13 in the battery case 11.

Preferably, the CID includes a deformable plate. The deformable plate is connected to the positive electrode collector, and electrically connects the positive electrode collector to the positive electrode terminal. When the internal pressure of the rectangular secondary battery 10 reaches or exceeds a predetermined value, the deformable plate deforms so that a portion of the deformable plate connected to the positive electrode collector moves away from the positive electrode collector. This deformation breaks the electrical connection between the deformable plate and the positive electrode collector. Thus, the electrode and the positive electrode terminal is electrically disconnected, and the current is interrupted.

Thus far, an example where the flat wound electrode is housed in the battery case 11 while having the winding axis aligned with the width direction is described, but this is not the only possible example. The flat wound electrode may be housed in the battery case while having the winding axis aligned with the height direction Z. Alternatively, the electrode may be a multi-layer electrode formed by stacking multiple rectangular positive electrode plates and rectangular negative electrode plates one on another with separators interposed therebetween.

As illustrated in FIG. 1, in the battery pack 100, the multiple rectangular secondary batteries 10 are connected in parallel by the parallel-connection bus bars 5a to form parallel-connected battery units 8, and the parallel connection units 8 are connected in series with the serial-connection bus bars 5b. In the battery pack 100 illustrated in FIG. 1, two adjacent rectangular secondary batteries 10 are connected in parallel with each bus bar 5 to form a parallel-connected battery unit 8, and adjacent parallel-connected battery units 8 are connected in series with each serial-connection bus bar 5b. Here, the battery pack of the present disclosure does not necessarily have to include a parallel-connected battery unit formed by connecting two rectangular secondary batteries 10 together. Instead, the battery pack may include a parallel-connected battery unit formed by connecting three or more rectangular secondary batteries together, or by connecting all the rectangular secondary batteries together in parallel.

The battery pack 100 according to the embodiment includes a short-circuit breaking portion 6. The short-circuit breaking portion 6 includes flexible sealing plates 12, each of which bulges out or deforms so that its center portion protrudes outward (upward) in response to a rise of the battery internal pressure, and an insulating plate 7, disposed between the surfaces of the sealing plates 12 and the bus bars 5. When the pressure of the rectangular secondary battery 10 reaches the operating pressure of the gas release valve 14, the sealing plate 12 bulges most at its center portion. The center portion of the sealing plate 12 is at the center of the sealing plate 12 in the longitudinal direction of the sealing plate 12, and at the center of the sealing plate 12 in the lateral direction of the sealing plate 12. The sealing plate 12 of the rectangular secondary battery 10 bulges most at the portion around the gas release valve 14.

Preferably, the center portion of the sealing plate 12 bulges by a bulge amount P (refer to FIG. 4) of greater than or equal to 1.5 mm from the outer peripheral edge of the sealing plate 12 when the pressure in the rectangular secondary battery 10 reaches the operating pressure of the gas release valve 14. The bulge amount P here is an amount by which the center portion of the sealing plate 12 bulges out from the outer peripheral edge of the sealing plate 12. This deformation, that is, bulge of the center portion of the sealing plate 12 by greater than or equal to 1.5 mm from the outer periphery further ensures interruption of the short-circuit current path as a result of the insulating plate 7 being pushed to separate the bus bars 5 from the electrode terminals 13. The bulge amount P at the center portion of the sealing plate 12 is preferably greater than or equal to 2 mm, or more preferably greater than or equal to 3 mm.

To allow the center portion of the sealing plate 12 to bulge out by the bulge amount P of greater than or equal to 1.5 mm, preferably, the sealing plate 12 has a thickness of smaller than or equal to 2.5 mm, an aspect ratio a/b is smaller than or equal to 6 where a denotes the dimension of long sides of the sealing plate 12 rectangular in a top view, and b denotes the dimension of short sides of the sealing plate 12, and the operating pressure of the gas release valve 14 formed in the sealing plate 12 is greater than or equal to 0.9 MPa. More specifically and more preferably, the aspect ratio a/b of the sealing plate 12 falls within the range of 5 to 6, the thickness of the sealing plate 12 falls within the range of 1.0 to 2.5 mm, and the operating pressure of the gas release valve 14 of the sealing plate falls within the range of 0.9 to 2.5 MPa. The dimension b of the short sides of the sealing plate 12, rectangular in a top view, preferably falls within the range of 2 to 5 cm, or more preferably, within the range of 2 to 4 cm.

As illustrated in FIG. 2, the insulating plate 7 is disposed on the surfaces of the sealing plates 12, and between the sealing plates 12 of the rectangular secondary batteries 10 partially connected in parallel and the bus bars 5. In the battery pack 100 including two or three rectangular secondary batteries 10 connected in parallel, a single insulating plate 7 is disposed at a portion opposing the sealing plates 12 of all the rectangular secondary batteries 10 connected in parallel, that is, two or three rectangular secondary batteries 10. In a battery pack including four or more rectangular secondary batteries connected in parallel, multiple insulating plates divided into multiple pieces may be disposed at portions opposing the sealing plates of the rectangular secondary batteries. The insulating plates divided into multiple pieces are disposed at portions opposing the sealing plates of at least two rectangular secondary batteries connected in parallel.

Figure 3:
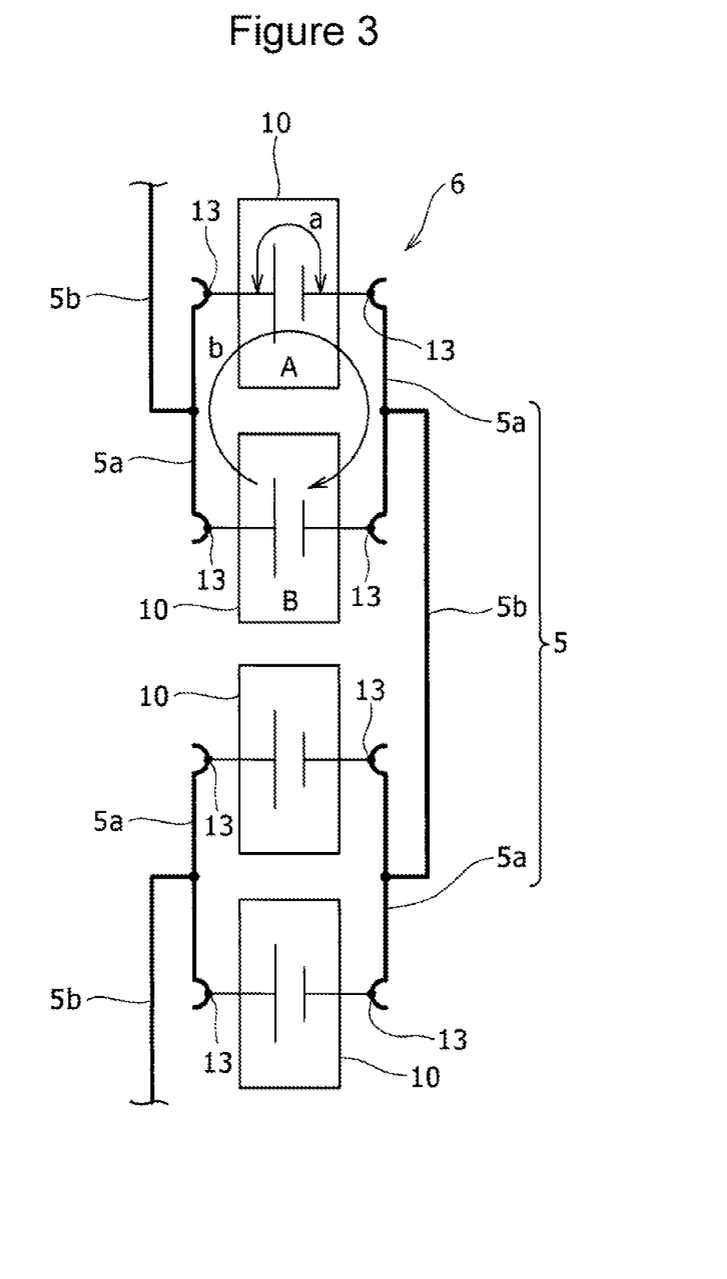
FIG. 3 illustrates a state where one of secondary batteries is internally short-circuited and triggers overheating of a parallel-connected battery.

The battery pack 100 includes a short-circuit breaking portion 6, which interrupts the current path along which the short-circuit current of the rectangular secondary batteries 10 connected in parallel or the parallel-connected batteries flows when any of the rectangular secondary batteries 10 is internally short-circuited. The schematic circuit diagram in FIG. 3 illustrates the battery pack 100 including the multiple rectangular secondary batteries 10 connected in parallel, in the state where when a rectangular secondary battery A (the uppermost rectangular secondary battery 10 in FIG. 3) is internally short-circuited (indicated with arrow a), a short-circuit current flows (indicated in arrow b) through an adjacent parallel-connected battery connected in parallel with the rectangular secondary battery A, that is, a rectangular secondary battery B (rectangular secondary battery 10 on the second layer from the top in FIG. 3). This is because, when the rectangular secondary battery A is internally short-circuited, the rectangular secondary battery B or a parallel-connected battery is short-circuited by an external short-circuit as illustrated in FIG. 3. In the state where any one rectangular secondary battery 10 is internally short-circuited and allows overcurrent to flow therethrough to overheat and the adjacent rectangular secondary battery 10 is externally short-circuited and allows overcurrent to flow therethrough to overheat, overheating propagates to the multiple rectangular secondary batteries 10 in a chain reaction manner. To prevent this effect, the short-circuit breaking portion 6 interrupts the current path of the short-circuit current of the parallel-connected batteries connected in parallel with the internally short-circuited rectangular secondary battery 10 to prevent overheating from triggering another overheating.

Figure 4:
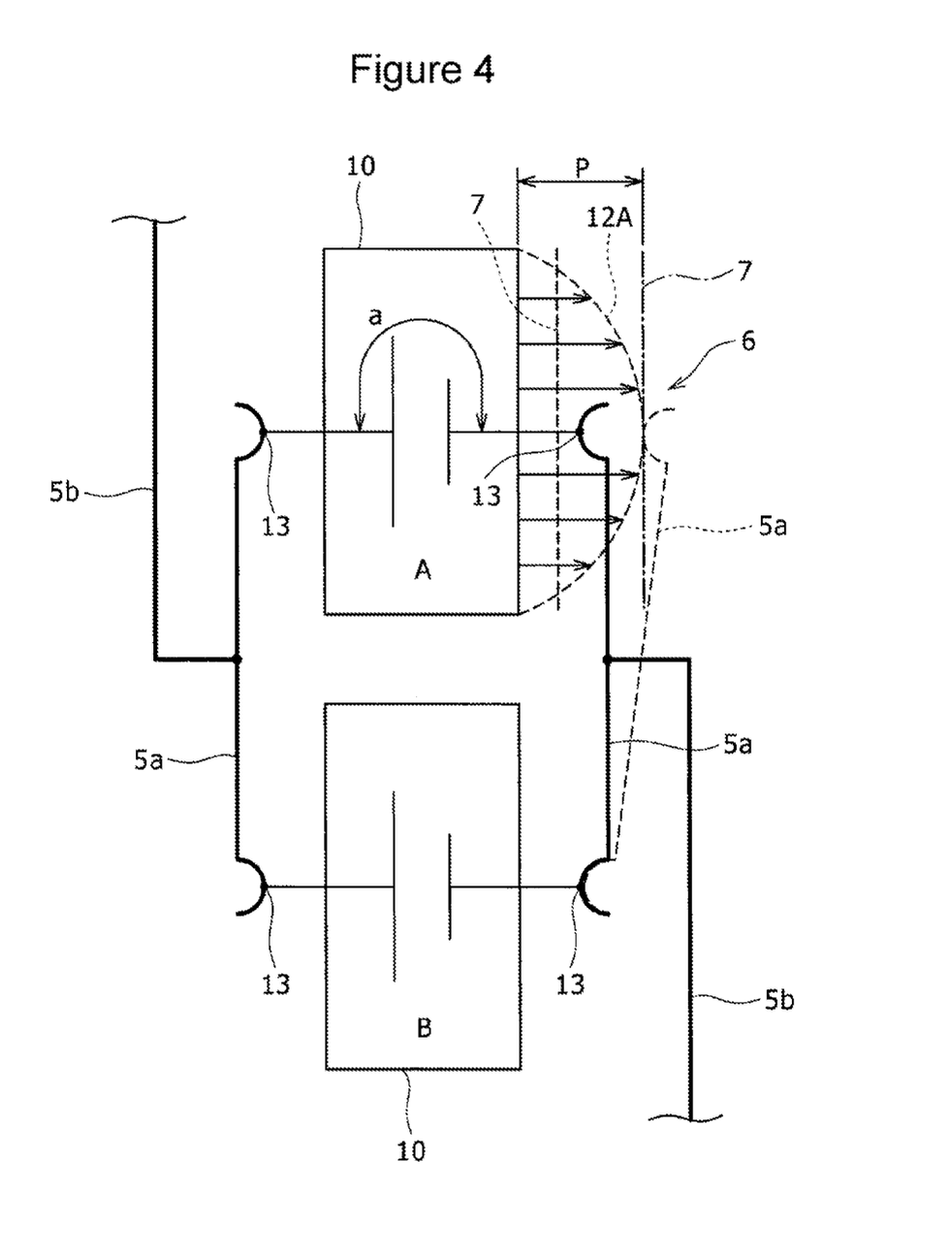
FIG. 4 illustrates a state where an insulating plate interrupts a short-circuit current path of a parallel-connected battery.

FIG. 4 illustrates the operation principle of the short-circuit breaking portion 6. As illustrated in FIG. 4, the insulating plate 7 is disposed on the surface of the sealing plate 12 of the rectangular secondary battery 10. Both end portions of the insulating plate 7 in the width direction are inserted between the sealing plate 12 and the parallel-connection bus bars 5a. When the upper rectangular secondary battery A is internally short-circuited to have its internal pressure raised, the sealing plate 12 deforms so as to bulge outward in a substantially arc shape. Through this deformation, the center portion of the sealing plate 12 deforms most and pushes up the insulating plate 7.

The insulating plate 7 is thus pushed up by the deformed center portion of the sealing plate 12. When the bulge of the center portion of the sealing plate 12 reaches or exceeds a preset value with respect to the outer peripheral edge of the sealing plate 12, the pushed-up insulating plate 7 pushes up the parallel-connection bus bar 5a to disconnect the parallel-connection bus bars 5a from the electrode terminals 13. Thus, the current path of the short-circuit current of the rectangular secondary battery B, which is a parallel-connected battery, caused by the external short-circuit is interrupted. FIG. 4 has described a case where the current path of the short-circuit current is interrupted by separating the electrode terminals 13 from the parallel-connection bus bars 5a using deformation of the sealing plate 12. However, this is not the only possible example. The short-circuit current path may be interrupted by breaking the parallel-connection bus bars 5a pushed up by the insulating plate 7. Instead, the short-circuit current path may be interrupted by melt-cutting the parallel-connection bus bars 5a as a result of partially breaking the parallel-connection bus bars 5a pushed up by the insulating plate 7 and reducing the cross-sectional area of the bus bars 5a.

Figure 5:
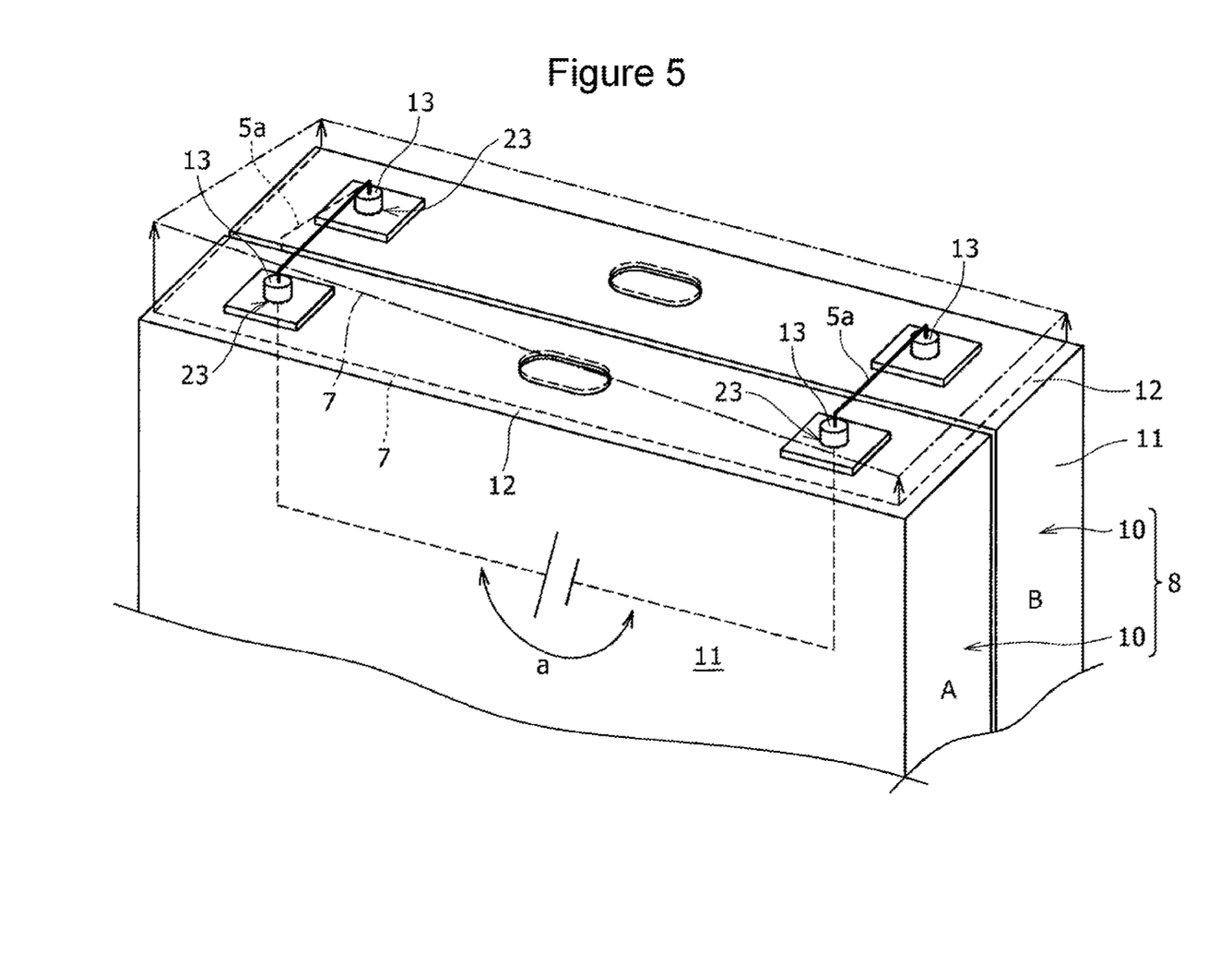
FIG. 5 is a schematic perspective view of a parallel-connected battery unit, in a state of interrupting the short-circuit current path of the parallel-connected batteries.
Figure 6:
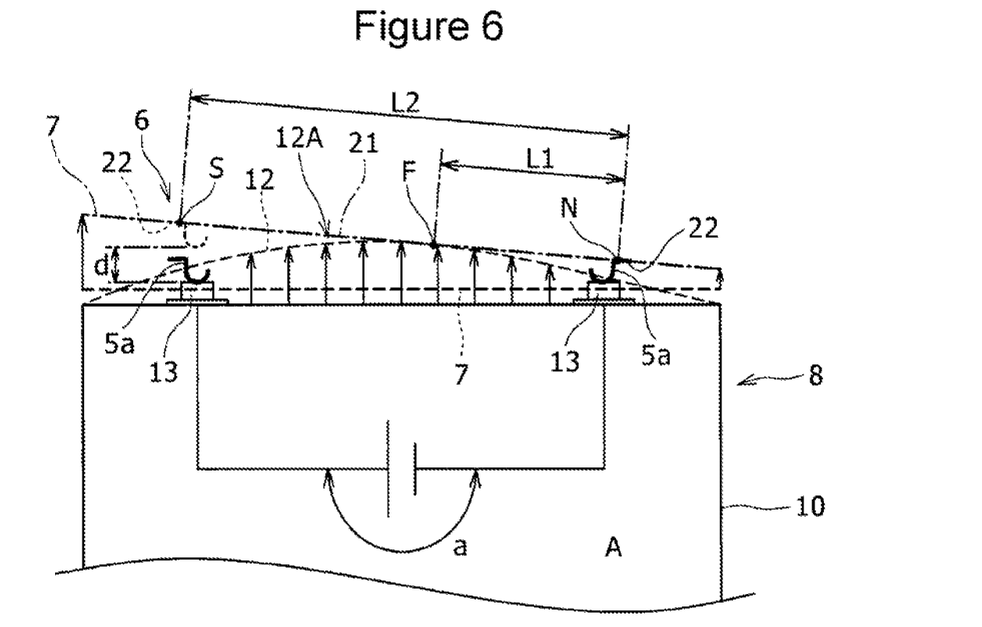
FIG. 6 is a cross-sectional view of the parallel-connected battery unit illustrated in FIG. 5, taken in the width direction.
Figure 7:
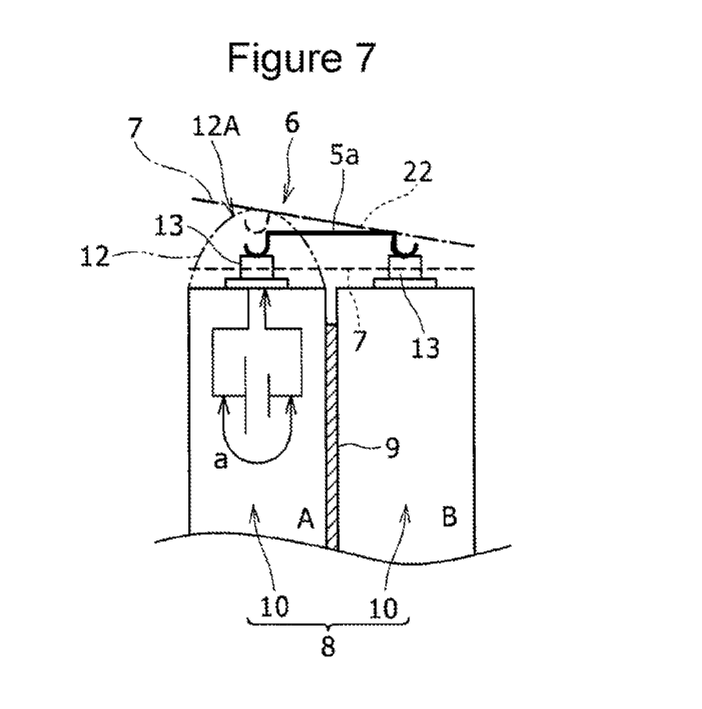
FIG. 7 is a cross-sectional view of the parallel-connected battery unit illustrated in FIG. 5, taken in the thickness direction.

FIG. 5 is a schematic perspective view of the parallel-connected battery unit 8 including two rectangular secondary batteries 10 connected in parallel. FIG. 5 illustrates the state where the rectangular secondary battery A is internally short-circuited to have its internal pressure raised and the sealing plate 12 deformed, and the short-circuit current path is interrupted. FIG. 6 is a schematic cross-sectional view of the rectangular secondary batteries 10 illustrated in FIG. 5, taken in the width direction. FIG. 7 is a schematic cross-sectional view of the rectangular secondary batteries 10 illustrated in FIG. 5, taken in the thickness direction, and illustrates the state where the sealing plate 12 pushes up the insulating plate 7. In FIG. 5 to FIG. 7, the insulating plate 7 disposed on the flat sealing plates 12 before being deformed is drawn with broken lines, and the insulating plate 7 pushed up by the sealing plate 12 deformed to have its center portion bulging out is drawn with dot-dash lines.

As illustrated in FIG. 5 to FIG. 7, the insulating plate 7 is disposed on the surfaces of the sealing plates 12 opposing the insulating plate 7. The insulating plate 7 is a single plate, and includes, as illustrated in FIG. 2, a pair of pressing portions 22 at both end portions of a plate portion 21. This insulating plate 7 may be a plastic plate or a metal plate with its surface insulated. The insulating plate 7 is a rigid insulating plate. As illustrated in FIG. 5 to FIG. 7, when the plate portion 21 is pushed up by the sealing plate 12, the plate portion 21 pushes up the bus bars 5a at the pressing portions 22 to separate the bus bars 5a from the electrode terminals 13. Thus, the parallel-connection external short-circuit path is interrupted to interrupt the short-circuit current that flows through the rectangular secondary battery B, which is a parallel-connected battery. Each sealing plate 12 has its outer peripheral edge fixed to the battery case 11. Thus, the sealing plate 12 deforms to have its center portion bulging out in response to an internal pressure rise of the rectangular secondary battery 10 due to, for example, an internal short-circuit. To be pushed up by the bulging sealing plate 12, the plate portion 21 of the insulating plate 7 is disposed at the center portio, and the pressing portions 22 are interposed between the bus bars 5 and the sealing plates 12.

With reference to FIG. 1 again, in the battery pack 100, multiple insulating plates 7 are disposed to be flush with each other on the upper surface of the battery block 2, that is, on the surface on which the sealing plates 12 of the multiple rectangular secondary batteries 10 are arranged. The multiple insulating plates 7 are pushed up while having gaps 17 at the borders between the adjacent insulating plates 7 without interfering with each other.

As illustrated in FIG. 2 and FIG. 5, each insulating plate 7 has through-holes 23, into which the electrode terminals 13 are inserted. Each through-hole 23 has an inner diameter that is greater than the profile of the electrode terminal 13, and allows the electrode terminal 13 to be inserted therein while the insulating plate 7 is made movable.

As illustrated in FIG. 6, the insulating plate 7 separates each bus bar 5a from the corresponding electrode terminal 13 while having a portion touching a convex portion 12A of the sealing plate 12 serving as a point F where force is applied, a portion that pushes up and moves apart from the bus bar 5a serving as a point S of application, and a portion that pushes up the bus bar 5a without moving apart from the bus bar 5a serving as a fulcrum N. The insulating plate 7 pushes up the bus bars 5a connected to the electrode terminals 13 (four electrode terminals 13 in FIG. 5) away from the electrode terminals 13. Here, each bus bar 5a is moved apart from the electrode terminal 13 at a portion having smallest breaking strength.

For example, in a battery pack where one electrode terminal 13 of the rectangular secondary battery 10 and the bus bar 5a connected to the electrode terminal 13 are made of aluminum and another electrode terminal 13 and the bus bar 5a connected to the electrode terminal 13 are made of copper (metal such as aluminum and copper has the meaning including alloys, herein), the connection portion between the aluminum-made electrode terminal 13 and the aluminum-made bus bar 5 is separated since aluminum has lower coupling strength than copper.

In FIG. 6, the insulating plate 7 pushed up by the convex portion 12A has the point S of application and the fulcrum N disposed on both sides of the point F where force is applied pressed by the convex portion 12A. When the bus bar 5a is pushed by the sealing plate 12 and separated from the electrode terminal 13 at the point S of application, the insulating plate 7 tilts. The flat insulating plate 7 is pressed by a curved surface of the convex portion 12A. In this state, the tilting insulating plate 7 has a distance between the point F where force is applied and the point S of application longer than the distance between the point F where force is applied and the fulcrum N. This is because the point F where force is applied moves toward the fulcrum N as a result of tilting of the insulating plate 7. As the point F where force is applied moves closer to the fulcrum N, the ratio of a distance L1 from the fulcrum N to the point F where force is applied and a distance L2 from the fulcrum N to the point S of application, that is, a leverage ratio L2/L1 increases, and the distance by which the bus bar 5a is separated from the electrode terminal 13 at the point S of application, that is, a gap d between the electrode terminal 13 and the bus bar 5 increases. When the gap d between the electrode terminal 13 and the bus bar 5 increases, a short-circuit current can be more reliably interrupted.

Figure 8:
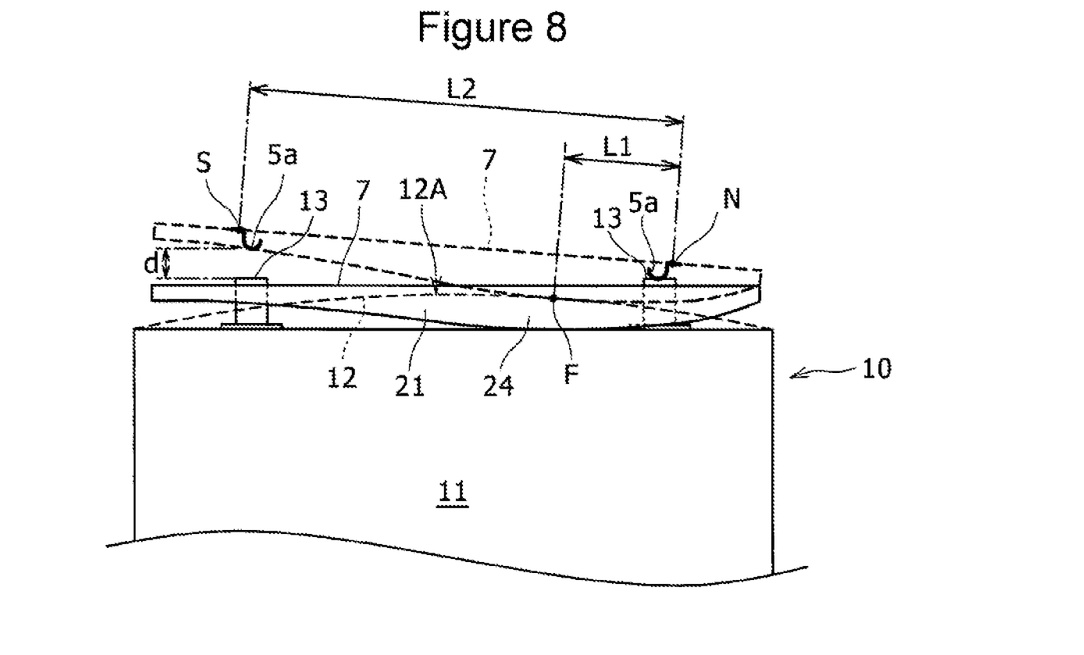
FIG. 8 is a schematic cross-sectional view of another example of an insulating plate pushed up by a sealing plate.
Figure 9:
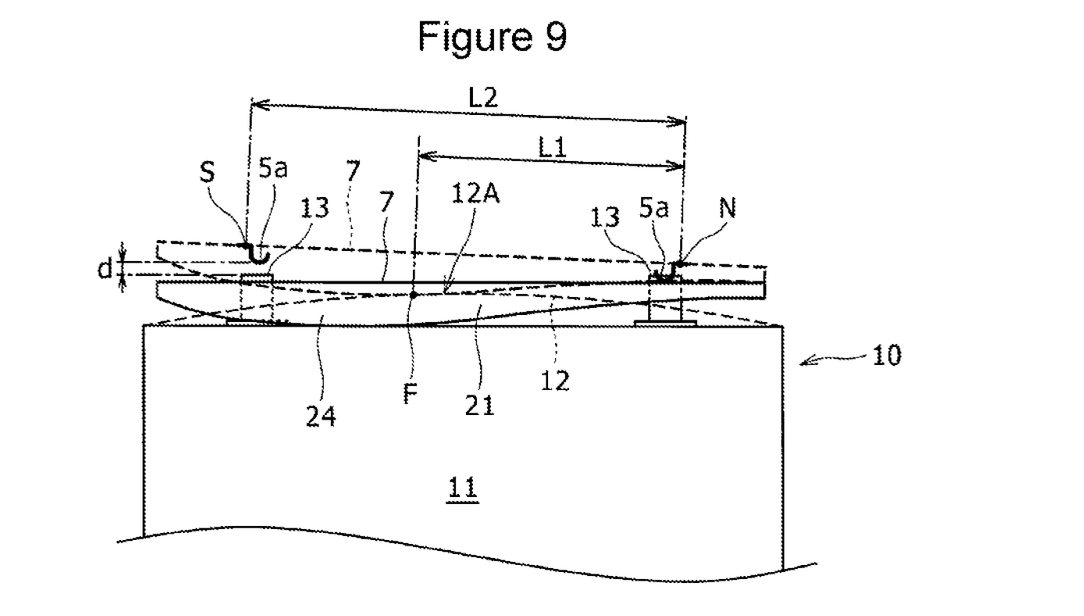
FIG. 9 is a schematic cross-sectional view of another example of an insulating plate pushed up by a sealing plate.

In the battery pack 100, the leverage ratio L2/L1 may be adjusted to appropriately set the gap d between the separated electrode terminal 13 and the bus bar 5. The position of the point F where force is applied may be changed by changing the shape of the surface of the insulating plate 7 opposing the sealing plate 12. The insulating plate 7 illustrated in the cross-sectional views of FIG. 8 and FIG. 9 has a convex surface opposing the sealing plate 12 to shift the position, in the width direction, of the point F where force is applied pressed by the bulging sealing plate 12. As illustrated in FIG. 8, the insulating plate 7 may have the leverage ratio L2/L1 increased by shifting the peak of a convex 24, bulging toward the sealing plate 12, toward the fulcrum N beyond the center portion, or as illustrated in FIG. 9, may have the leverage ratio L2/L1 reduced by shifting the peak of the convex 24 toward the point S of application beyond the center portion. Increasing the leverage ratio L2/L1 can increase the gap d by which the bus bar 5 is separated from the electrode terminal 13, whereas reducing the leverage ratio L2/L1 can increase the force of the point S of application to separate the bus bar 5 from the electrode terminal 13. The gap d by which the bus bar 5 is separated from the electrode terminal 13 and the force of the point S of application to separate the bus bar 5 from the electrode terminal 13 are mutually contradictory. Thus, the leverage ratio L2/L1 may be appropriately set in consideration of the separation distance of the bus bar 5 and the separation force.

As illustrated in FIG. 2, the insulating plate 7 has gas vent holes 26, which allow gas released from the gas release valves 14 in the sealing plates 12 to pass therethrough, at a position opposing the gas release valves 14. The gas vent holes 26 allow gas released from the gas release valves 14 to be smoothly discharged.

The coupling strength between the electrode terminal 13 and the bus bar 5a can be adjusted with the area over which the bus bar 5a is welded to the electrode terminal 13. Specifically, reducing the area over which the bus bar 5a is welded to the electrode terminal 13 can reduce the coupling strength, whereas increasing the area over which the bus bar 5a is welded to the electrode terminal 13 can increase the coupling strength. Here, the coupling strength between the bus bar 5a and the electrode terminal 13 can be adjusted by changing the shape of a welding portion between the electrode terminal 13 and the bus bar 5a. The coupling strength between the bus bar 5a and the electrode terminal 13 can be also adjusted by changing the materials of the electrode terminal 13 and the bus bar 5a. The coupling strength between the bus bar 5a and the electrode terminal 13 can be also adjusted by changing the conditions for welding the bus bar 5a to the electrode terminal 13. For laser welding, the coupling strength can be adjusted by changing, for example, a laser output, a laser irradiation area, or an irradiation time length. For ultrasonic welding, the coupling strength can be adjusted by changing, for example, an output, a pressing force, or a supersonic vibration time length.

Alternatively, a short-circuit current can be interrupted by breaking part of the parallel-connection bus bar 5a. As illustrated in FIG. 2, the parallel-connection bus bar 5a may have its width reduced at the center portion in the longitudinal direction or its thickness reduced at a to-be-broken portion, not illustrated, to forcibly reduce the tensile strength to interrupt the short-circuit current. In this embodiment, the parallel-connection bus bar 5a has indentations 5d on both sides of the metal plate to have a narrow portion 5c at the center portion, or, may have a portion of the metal plate thinned by pressing or cutting to reduce the tensile strength, so that the bus bar 5a is broken at this portion when pushed up by the pressing portion 22. Breaking of the parallel-connection bus bar 5a does not necessarily have to be caused by a mechanical effect of the pressing portions 22. The parallel-connection bus bar 5a may be broken by pressing of the pressing portion 22 and heating of the parallel-connection bus bar 5a with current flowing through the narrow portion 5c.

Subsequently, an example of the present disclosure will be described.

Example 1

Manufacturing of Positive Electrode Plate

A dispersion fluid containing a lithium transition metal complex oxide ($LiNi_{0.35}Co_{0.35}Mn_{0.3}O_2$), serving as a positive electrode active material, a lithium carbonate, serving as a gas forming agent, acetylene black, serving as an electrical conducting agent, and a polyvinylidene fluoride, serving as a binder, dispersed in N-Methyl-2-pyrrolidone (NMP) was used as a positive electrode active material slurry. Here, the mass ratio between the positive electrode active material, the gas forming agent, the electrical conducting agent, and the binder was set at 95.8:0.9:2.1:1.2. The positive electrode active material slurry was applied to both surfaces of a positive electrode core (thickness of 15 µm) made of an aluminum alloy. Here, the positive electrode active material slurry was not applied to end portions on one side (end portions on the same side on both surfaces) of the positive electrode core in the longitudinal direction, to leave the portions of the positive electrode core exposed to the outside to form a positive-electrode-core exposed portion. This electrode plate was dried to remove NMP in the positive electrode active material. Thereafter, the electrode plate was rolled with a pressure roller, and cut into a predetermined size to be formed into a positive electrode plate.

Manufacturing of Negative Electrode Plate

Natural graphite, serving as a negative electrode active material, styrene-butadiene rubber, serving as a binder, and carboxymethyl cellulose, serving as a thickener were mixed at the mass ratio of 98:1:1, and further mixed with water to be formed into a negative electrode active material slurry. Thereafter, the negative electrode active material slurry was applied to both surfaces of a copper-made negative electrode core (thickness of 8 µm). Here, the negative electrode active material slurry was not applied to end portions on one side (end portions on the same side on both surfaces) of the negative electrode core in the longitudinal direction, to leave the portions of the negative electrode core exposed to the outside to form a negative-electrode-core exposed portion. This electrode plate was dried to remove water in the negative electrode active material slurry. Thereafter, the electrode plate was rolled with a pressure roller, and cut into a predetermined size. Then, alumina, an acrylonitrile binder, and NMP were mixed at the mass ratio of 30:0.9:69.1 to be formed into a protective layer slurry, and the protective layer slurry was applied onto the negative electrode active material layer. This electrode plate was dried to remove NMP in the protective layer slurry to form a negative electrode plate including a protective layer. Here, the protective layer had a thickness of 2 μm.

Non-Aqueous Electrolyte

Ethylene carbonate (EC), ethyl methyl carbonate (EMC), and diethyl carbonate (DEC) were mixed at the volume ratio (25° C. at 1 atmospheric pressure) of 3:3:4 to form a mixture solvent. $LiPF_6$ was added to this mixture solvent to be 1 mol/L. In addition, vinylene carbonate (VC) was added to a non-aqueous electrolyte at 0.3 percentage of mass with respect to the gross mass of the non-aqueous electrolyte to form a nonaqueous electrolyte solution.

Assembly of Battery

The positive electrode plate and the negative electrode plate were shifted so that the positive-electrode-core exposed portion and the negative-electrode-core exposed portion do not overlap the opposing electrode composite layers, wound while being insulated from each other with a separator interposed therebetween, and press-formed into a flat shape to form a flat wound electrode. Examples preferably usable as a separator include two polyolefin-made microporous layers and a folded long polyolefin-made microporous layer. The separator used here has such a width as to cover the positive electrode compound layer and larger than the width of the negative electrode compound layer.

Multiple positive-electrode-core exposed portions stacked one on another are electrically connected to the positive electrode terminal via the positive electrode collector. Multiple negative-electrode-core exposed portions stacked one on another are electrically connected to the negative electrode terminal via the negative electrode collector.

The wound electrode has its surrounding except the surface facing the sealing plate covered with a resin-made insulating sheet, and inserted into and housed in a rectangular battery case. The sealing plate is fitted into the opening of the rectangular battery case, and the fitted portion between the sealing plate and the battery case is laser welded. Thus, the opening of the rectangular battery case is hermetically sealed with the sealing plate. Thereafter, the above nonaqueous electrolyte solution is poured from an electrolyte solution spout of the sealing plate, and the electrolyte solution spout is sealed with a sealing member such as a blind rivet. Thus, a rectangular secondary battery of Example 1 is formed. Here, the rectangular secondary battery of Example 1 has a profile with a width of 148 mm, a height of 91 mm, and a thickness of 26.5 mm, and has a battery capacity of 50 Ah.

The rectangular secondary battery of Example 1 included an aluminum-made sealing plate having an aspect ratio a/b of 5.8, a thickness of 2 mm, and the operating pressure of the gas release valve of 1.9 MPa.

Example 2

A rectangular secondary battery of Example 2 had the same structure as that of Example 1 except for an aluminum-made sealing plate having an aspect ratio a/b of 6.0, a thickness of 2.5 mm, and the operating pressure of the gas release valve of 0.9 MPa.

Forming of Battery Unit

Figure 10:
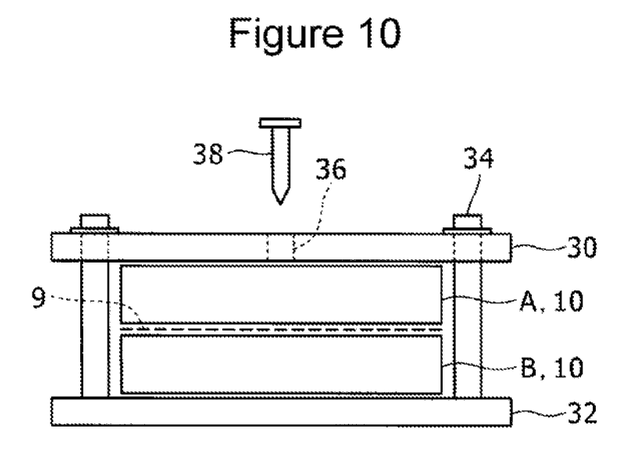
FIG. 10 illustrates a method for testing a battery unit including secondary batteries according to an example.

Two rectangular secondary batteries of Example 1 formed in the above-described manner were prepared. As illustrated in FIG. 10, an insulating separator 9 was interposed between the two rectangular secondary batteries 10 in a stacked manner. Thereafter, the insulating plate 7 was disposed on the sealing plates of the rectangular secondary batteries, the positive electrode terminals were connected in parallel with an aluminum-made bus bar 5a, and the negative electrode terminals were connected in parallel with a copper-made bus bar 5a. The bus bars 5a were welded to the electrode terminals by laser welding. Thus, a battery unit including the rectangular secondary batteries of Example 1 was formed. Similarly, a battery unit including two rectangular secondary batteries of Example 2 was formed.

Test Method

As illustrated in FIG. 10, each battery unit was interposed between two stainless steel plates 30 and 32, which are quadrilateral in a top view and have a thickness of 20 mm. The two stainless steel plates 30 and 32 were fastened with four bolts 34 to fix the battery unit. The stainless steel plate 30 has a through-hole 36 of a diameter of 3 mm at its center portion. Through this through-hole 36, a metal nail 38 of a diameter of 1.2 mm was driven into the rectangular secondary battery A on the upper side to cause thermal runaway (overheating) through an internal short-circuit. Then, whether the thermal runaway propagates to the lower rectangular secondary battery B, adjacent to a trigger battery or the upper rectangular secondary battery A, and whether the insulating plate 7 is pushed up by the bulge of the sealing plate 12 to separate the bus bars 5a from the electrode terminals 13 were observed. Whether the thermal runaway propagates to the lower rectangular secondary battery B was determined on the basis of whether the rectangular secondary battery B caused smoking.

Test Results

Table 1 shows the test results. As shown in Table 1, below, in each of the battery units including the rectangular secondary batteries of Example 1 and Example 2, before the gas release valve 14 opened, the insulating plate 7 was pushed up by the sealing plate 12 of the trigger battery A that bulges by the bulge amount P of greater than or equal to 1.5 mm, and thus the bus bars 5a were pushed up through the insulating plate 7 to be separated from the electrode terminals 13. The results show that the battery packs including the rectangular secondary batteries 10 of Example 1 and Example 2 can effectively prevent the parallel-connected battery B from being externally short-circuited with the sealing plate 12 of the trigger battery A, and can prevent propagation of the thermal runaway.

TABLE 1

| Battery Unit | Sealing Plate Aspect Ratio (a/b) | Sealing Plate Thickness (mm) | Gas Release Valve Operating Pressure (MPa) | Sealing Plate Bulge Amount P (mm) | Bus Bar Breakage | Thermal Runaway Propagation |
| --- | --- | --- | --- | --- | --- | --- |
| Example 1 | 5.8 | 2 | 1.9 | 4 | Favorable (Welded Portion Broken) | Favorable (Thermal Runaway Not Propagated) |

TABLE 1-continued

| Battery Unit | Sealing Plate Aspect Ratio (a/b) | Sealing Plate Thickness (mm) | Gas Release Valve Operating Pressure (MPa) | Sealing Plate Bulge Amount P (mm) | Bus Bar Breakage | Thermal Runaway Propagation |
|---|---|---|---|---|---|---|
| Example 2 | 6.0 | 2.5 | 0.9 | 1.5 | Favorable (Welded Portion Broken) | Favorable (Thermal Runaway Not Propagated) |

The battery pack according to the present disclosure and a rectangular secondary battery including the battery pack are not limited to those according to the above-described embodiment, modification examples, and examples, and can naturally be changed or modified in various different manners within the scope described in claims of this application.

The insulating plate does not necessarily have to be directly disposed on the sealing plates. For example, another member may be interposed between the insulating plate and the sealing plates. Alternatively, another member may be interposed between the insulating plate and the bus bars.

In a battery pack, it is not necessary for all the secondary batteries to be connected in parallel. It suffices that at least two secondary batteries are connected in parallel.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A battery pack, comprising:
a battery unit including a plurality of secondary batteries, each including a sealing plate and a positive electrode terminal attached to the sealing plate and a negative electrode terminal attached to the sealing plate;
a bus bar that connects the secondary batteries together in parallel;
an insulating plate disposed between the sealing plate of each secondary battery and the bus bar; and
a short-circuit breaking portion that interrupts an electric conduction path between the secondary batteries connected in parallel by allowing each sealing plate to bulge outward in response to an internal pressure rise of the corresponding secondary battery to push up the insulating plate and push up the bus bar with the insulating plate interposed therebetween,
wherein each sealing plate includes a gas release valve that opens when receiving a pressure of higher than or equal to a predetermined operating pressure, and
wherein a portion of each sealing plate that bulges most protrudes outward by greater than or equal to 1.5 mm from an outer peripheral edge of the sealing plate when a pressure in the corresponding secondary battery reaches the operating pressure.

2. The battery pack according to claim 1, wherein the portion of each sealing plate that bulges most when the pressure in the corresponding secondary battery reaches the operating pressure is a center portion of the sealing plate.

3. The battery pack according to claim 1, wherein the short-circuit breaking portion allows the bus bar to be separated from the electrode terminal or to be broken as a result of the bus bar being pushed up with the insulating plate interposed between the bus bar and the sealing plate.

4. The battery pack according to claim 1, wherein the sealing plate is formed from a flexible rectangular plate, an aspect ratio of the sealing plate, which is a ratio of a long side dimension to a short side dimension, is smaller than or equal to 6, the sealing plate has a thickness of smaller than or equal to 2.5 mm, and an operating pressure of a gas release valve formed in the sealing plate is higher than or equal to 0.9 MPa.

5. The battery pack according to claim 4, wherein the aspect ratio of the sealing plate falls within a range of 5 to 6, the thickness of the sealing plate falls within a range of 1.0 to 2.5 mm, and the operating pressure of the gas release valve formed in the sealing plate falls within a range of 0.9 to 2.5 MPa.

6. The battery pack according to claim 1, wherein the sealing plate is formed from an aluminum plate or an aluminum alloy plate.

* * * * *